Figure 1:
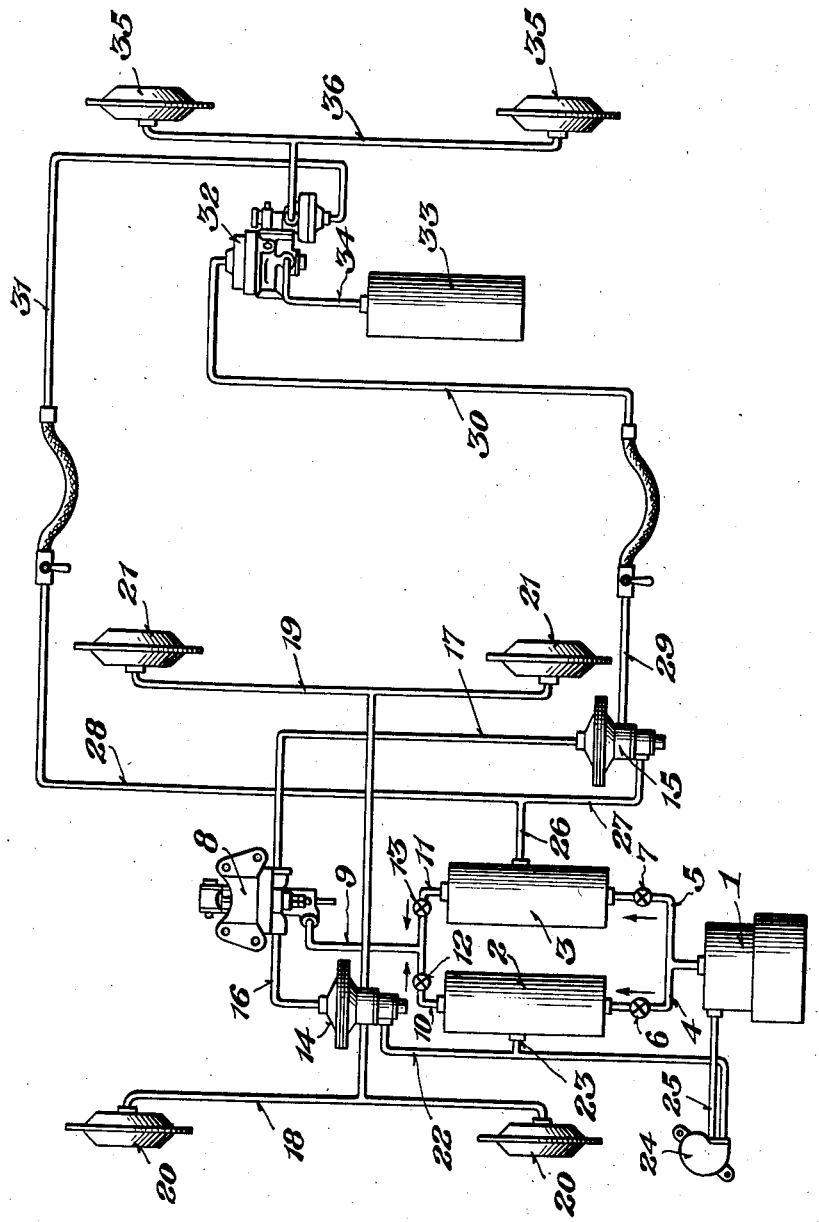

Dec. 17, 1935.     W. A. EATON     2,024,343
FLUID PRESSURE BRAKING SYSTEM
Filed Aug. 18, 1932     6 Sheets-Sheet 2

Inventor
W. A. Eaton,
By
Attorney

Dec. 17, 1935.    W. A. EATON    2,024,343
FLUID PRESSURE BRAKING SYSTEM
Filed Aug. 18, 1932    6 Sheets-Sheet 3

Inventor
W. A. Eaton,
By N. D. Parker Jr.
Attorney

Dec. 17, 1935.   W. A. EATON   2,024,343
FLUID PRESSURE BRAKING SYSTEM
Filed Aug. 18, 1932   6 Sheets-Sheet 4

Inventor
W. A. Eaton,
By
Attorney

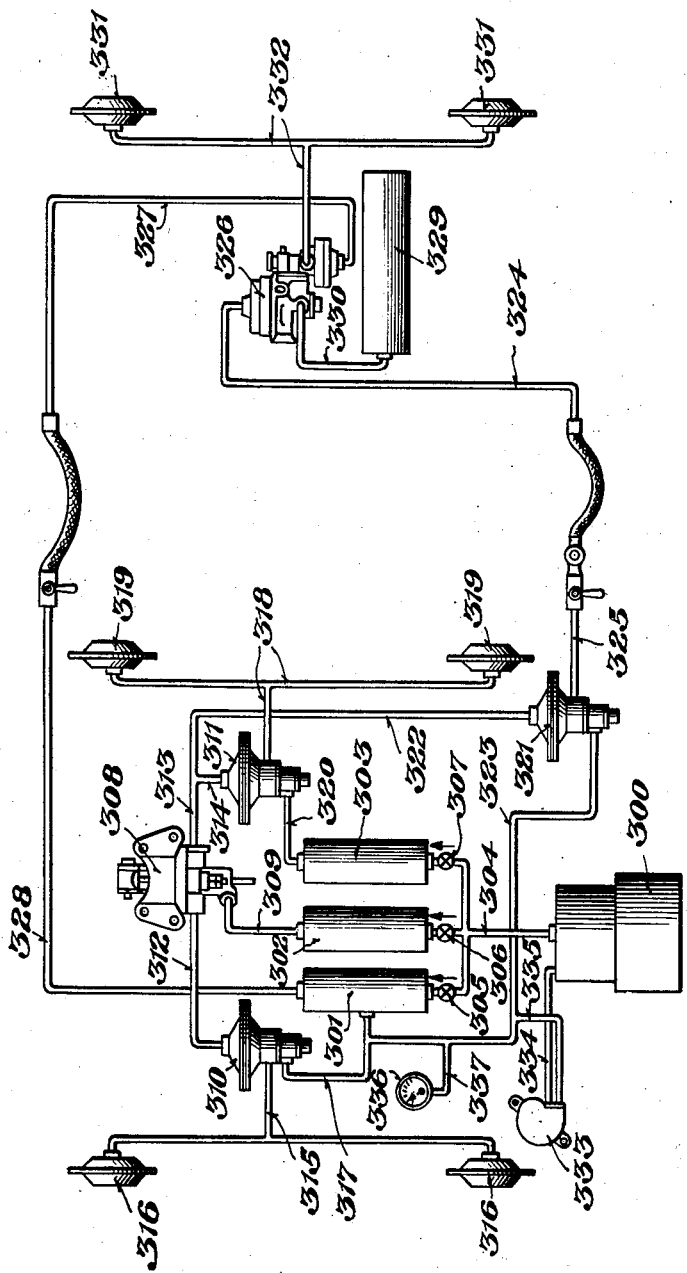

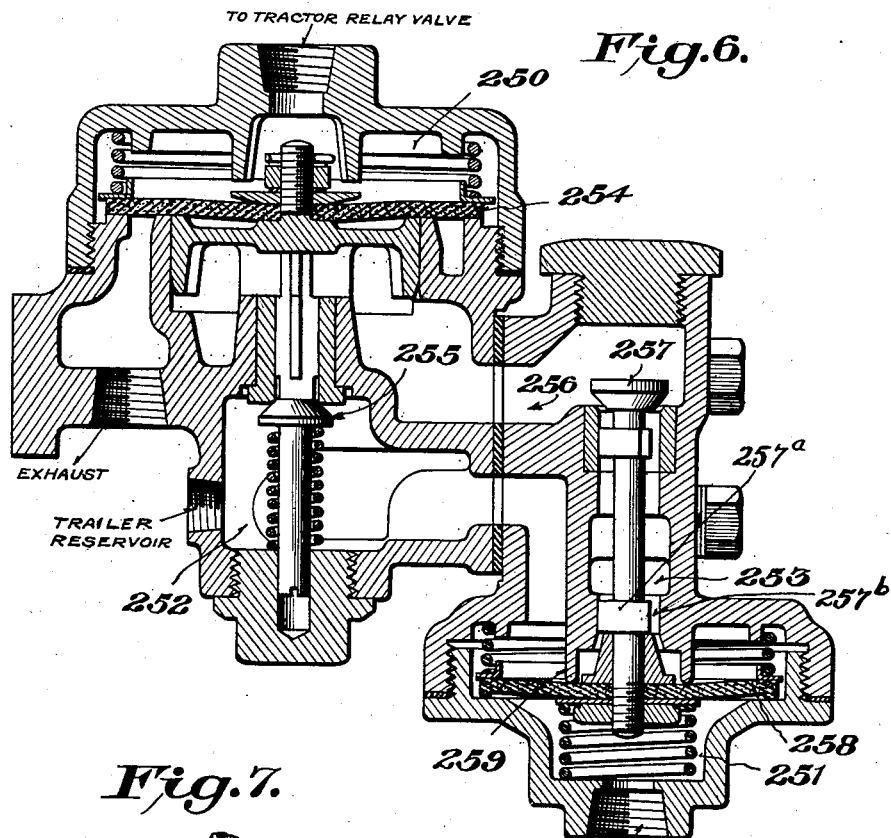

Patented Dec. 17, 1935

2,024,343

UNITED STATES PATENT OFFICE 2,024,343

FLUID PRESSURE BRAKING SYSTEM

Wilfred A. Eaton, Pittsburgh, Pa., assignor to Bendix Westinghouse Automotive Air Brake Company, Pittsburgh, Pa., a corporation of Delaware Application August 18, 1932, Serial No. 629,349

4 Claims. (Cl. 303—26)

This invention relates to brakes and more particularly to fluid pressure braking systems for tractor-trailer vehicles.

It is an object of the present invention to provide a fluid pressure braking system for tractor-trailer vehicles which will be so designed that in the event of any failure of the air lines between the two vehicles, no adverse effect on the braking system of either vehicle will result.

Another object of the invention is to provide a fluid pressure braking system for tractor-trailer vehicles which will include means for insuring tractor brake operation upon failure of the air lines between the two vehicles.

Another object is to provide a fluid pressure braking system which will include novel means for automatically operating the brakes of the trailer vehicle in the event of that vehicle breaking away from the tractor vehicle.

A further object is to provide a braking system for a four wheeled vehicle in which the failure of either the front or rear brake line will not prevent operation of the other set of brakes.

A still further object is to provide a tractor-trailer braking system in which means are provided for sealing off either the brake system on the tractor or that on the trailer on breaking of the other system or pulling apart of the two vehicles.

A still further object is to provide a tractor-trailer fluid-pressure braking system including novel means operating in series for transmitting fluid under pressure and for sealing off any portion of the system which has failed.

A still further object is to provide a fluid pressure braking system including a plurality of sources of fluid under pressure operating in conjunction with relay means for transmitting fluid under pressure and insuring operation of a part of the braking system on failure of any other part of the system.

Other objects and novel features of the invention will appear from the following detailed description when taken in connection with the accompanying drawings. It is expressly understood, however, that the drawings are for purposes of illustration only and are not to be taken as a definition of the limits of the invention, reference being had for this purpose to the appended claims.

Figure 2:
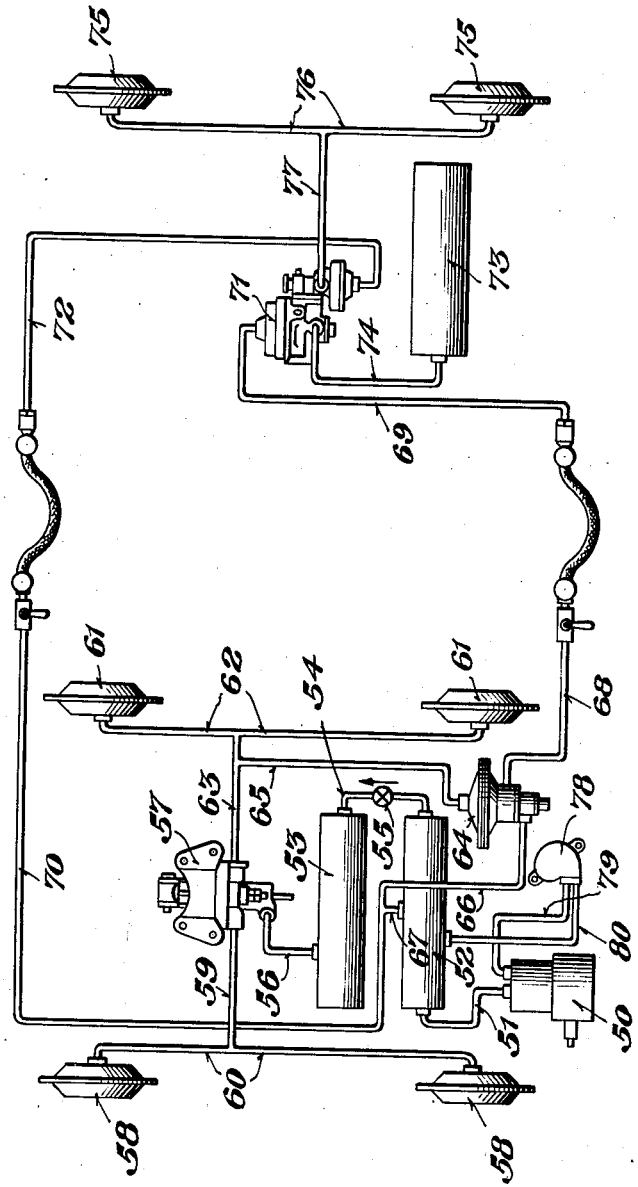
Figure 3:
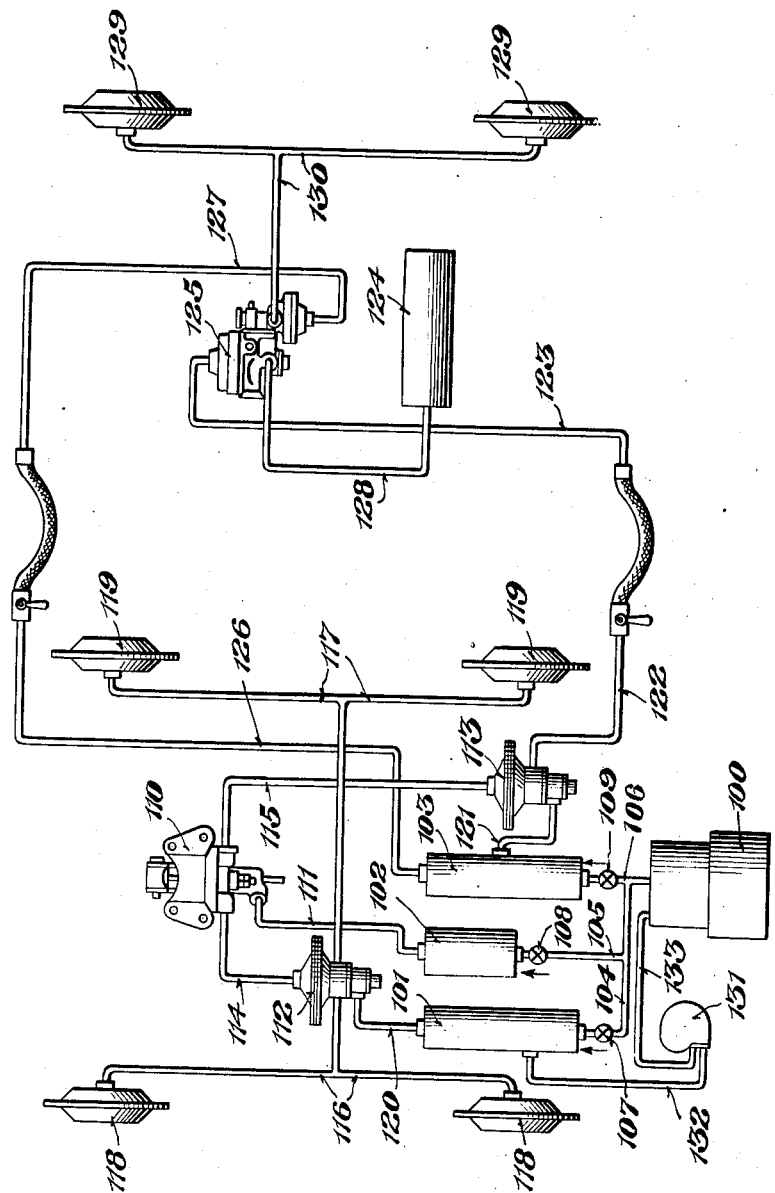
Figure 4:
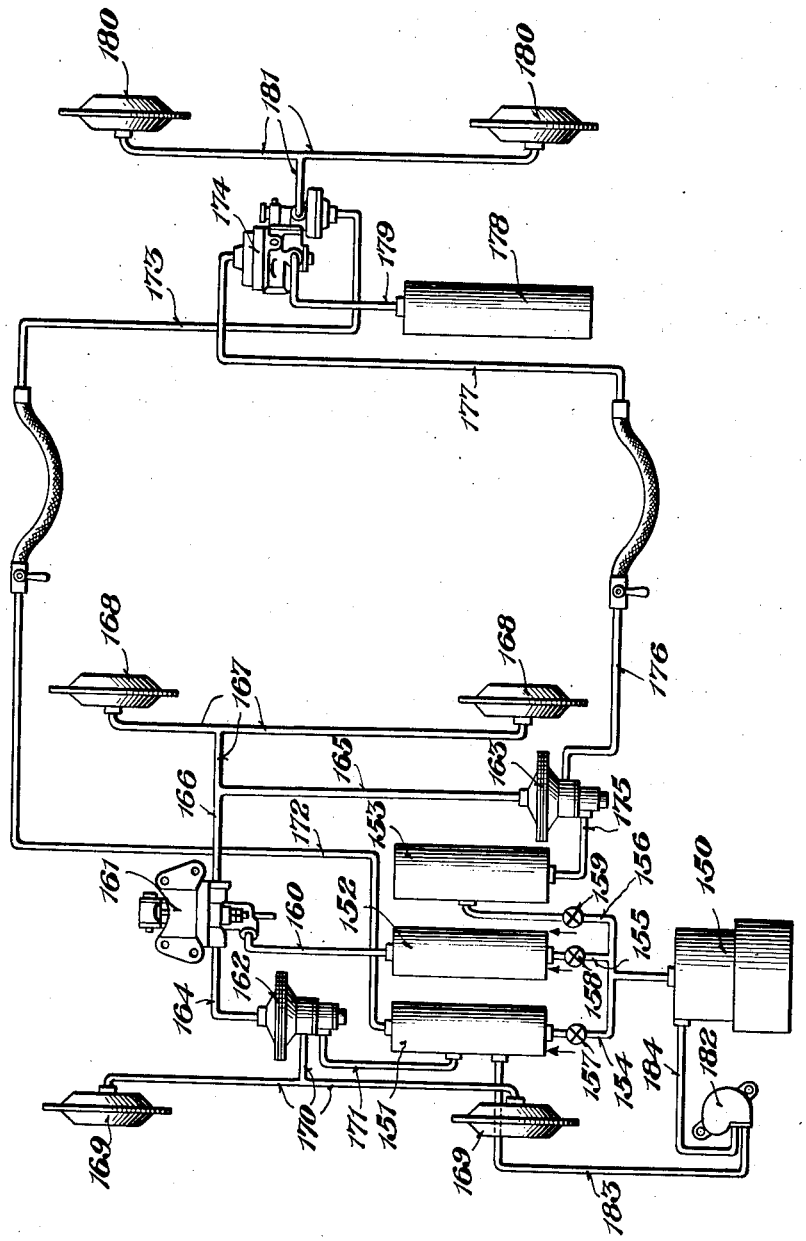

In the drawings, in which similar reference numbers refer to similar parts:

Fig. 1 is a view showing a fluid pressure braking system according to the present invention, Fig. 2 is a view showing a modified form of the fluid pressure braking system according to the present invention, Fig. 3 is a view showing another modified system, Fig. 4 is a view showing still another modification of the present invention, Fig. 5 is a view showing a further modification, Fig. 6 is a sectional view showing the trailer relay-emergency valve disclosed more generally in other figures of the drawings, and Fig. 7 is a sectional view showing the relay valve construction disclosed more generally in other figures.

Referring particularly to Fig. 1 of the drawings, wherein is disclosed what may be considered the preferred embodiment of the system, it will be seen that such system includes a compressor 1 supplying fluid under pressure, such as compressed air, to reservoirs 2 and 3 through pipes 4 and 5, the same including check valves 6 and 7 which allow compressed fluid to flow from the compressor to the reservoirs but not in the opposite direction. A brake valve 8 is provided, the lower chamber of the same being connected to reservoirs 2 and 3 by pipe 9 and connecting pipes 10 and 11, the same including check valves 12 and 13, which allow flow of fluid under pressure from the reservoirs to the brake valve but not in the opposite direction.

Relay valves 14 and 15 are provided on the tractor, and the upper chambers 201 thereof, Fig. 7, are connected to brake valve 8 by pipes 16 and 17, whereby said chambers may be connected to reservoirs 2 and 3 on operation of brake valve 8. Chamber 202 of relay valve 14 is connected by pipes 18 and 19 respectively to front brake chambers 20 and rear brake chambers 21. Chamber 203 of relay valve 14 is connected by pipes 22 and 23 to reservoir 2, pipe 22 also leading to a governor unit 24 which is connected to compressor 1 through pipe 25 for controlling the operation of the same. Chamber 203 of relay valve 15 is connected by pipes 26 and 27 to reservoir 3, pipe 26 being also connected to a pipe 28 which connects to the trailer emergency line 31. Chamber 202 of relay valve 15 is connected to a pipe 29 which connects to the trailer service line 30.

The trailer equipment comprises a relay-emergency valve, the same being more fully illustrated in Fig. 6 of the drawings. Chamber 250 of such valve is connected to trailer service line 30, and chamber 251 of the emergency portion of such valve is connected to the trailer emergency line 31. Trailer reservoir 33 is connected by pipe 34 to chamber 252 of the relay-emergency valve, and trailer brake chambers 35 are connected by piping 36 to chamber 253 of this valve. As shown, chambers 251 and 252 are separated by a diaphragm 258 the periphery of which is normally seated upon a portion of the valve casing while the central portion thereof normally contacts a ridge or seat 259. A normally open valve 257, interposed between chambers 253 and 256 is carried by the central portion of the diaphragm 258, the stem of said valve carrying a guide member 257ª in the form of a disk, having a segment thereof cut away to form a small opening 257ᵇ between chambers 252 and 253 when these latter are placed in communication as will appear more fully hereinafter. It is to be understood that the specific construction of the relay-emergency valve, as well as that of the relay valves, forms no part of the present invention.

In operation of the system disclosed in Fig. 1, the compressor 1 supplies fluid under pressure to reservoirs 2 and 3, this fluid being supplied at all times to valve 8. On operation of valve 8, fluid under pressure will flow from the said valve to chambers 201 of relay valves 14 and 15, operating the diaphragm 204 in each of such valves, closing the exhaust ports 205, and connecting chambers 202 and 203. Such operation of relay valve 14 effects the connection of tractor front brake chambers 20 to reservoir 2 through pipe 18, chambers 202 and 203 of relay valve 14, and pipes 22 and 23, and also the connection of tractor rear brake chambers 21 to reservoir 2 through pipe 19, chambers 202 and 203 of relay valve 14, and pipes 22 and 23, thereby applying all tractor brakes. Operation of relay valve 15, as outlined above, causes fluid pressure from reservoir 3 to flow through pipes 26 and 27, chambers 203 and 202 of relay valve 15, and pipes 29 and 30 to chamber 250 of trailer relay-emergency valve 32, operating the diaphragm 254 and valve 255 therein, and connecting trailer reservoir 33 to trailer brake chambers 35 through pipe 34, chamber 252, past valve 255, chamber 256, past opened valve 257, to chamber 253, and through pipe 36 to the brake chambers. It will be seen that valve 257 is held in open position by pressure from tractor reservoir 3 acting in chamber 251 against the lower side of diaphragm 258.

In the event of failure of any of lines 18, 22, 23, 10 or 19, reservoir 2 will drain to the atmosphere on operation of brake valve 8 to effect a normal service application. Due, however, to the interposition of check valves 6 and 12, reservoir 3 will not drain and pressure from this reservoir will be available to operate relay valve 15 and thereby cause an application of the trailer brakes. No application of any tractor brakes may be had, however, in the event of the failure of any of the above-noted lines.

In case of failure of either of lines 16 or 17, both tractor reservoirs will drain to the atmosphere upon application of the brake valve 8 and the consequent reduction in pressure in reservoir 3 and pipes 28 and 31 will cause an emergency operation of trailer relay-emergency valve 32, thereby connecting trailer reservoir 33 to the trailer brake chambers and applying the trailer brakes.

Assuming failure of any of lines 9, 11, 26, 27, 28 or 31, reservoir 3 will immediately drain to the atmosphere, thereby reducing the pressure in chamber 251 of trailer relay-emergency valve 32 and effecting an emergency operation of such valve, thereby connecting trailer reservoir 33 to trailer brake chambers 35. It will be noted that such operation is entirely automatic and is not dependent upon operation of the tractor brake valve.

Referring now to the system illustrated in Fig. 2 of the drawings it will be observed that compressor 50 is connected by pipe 51 to reservoir 52, said reservoir being connected to a second reservoir 53 by a pipe 54 including a one-way check valve 55. Reservoir 53 is connected by a pipe 56 to the usual brake valve 57, and such brake valve is in turn connected to tractor front brake chambers 58 by pipes 59 and 60, and to tractor rear brake chambers 61 by pipes 62 and 63, whereby upon operation of the brake valve, fluid under pressure from reservoirs 52 and 53 may be transmitted to brake chambers 58 and 61 to effect a braking of the vehicle. A relay valve 64, Fig. 7, is provided, and the chamber 201 thereof is connected by pipe 65 to the pipe 63 leading to the brake valve whereby on brake-applying operation of the latter, fluid under pressure will be transmitted to chamber 201 of the relay valve. Chamber 203 of the relay valve is connected by pipes 66 and 67 to reservoir 52, and chamber 202 of the said valve is connected by pipe 68 to the trailer service pipe 69 which connects to chamber 250 of the trailer relay-emergency valve 71, the same being more fully disclosed in Fig. 6 of the drawings. Reservoir 52 is constantly connected by pipe 70 to trailer emergency line 72 which is connected to chamber 251 of the trailer relay-emergency valve 71 whereby fluid under pressure from reservoir 53 acts on diaphragm 258 to maintain valve 257 in opened position. A trailer reservoir 73 is provided and is connected by pipe 74 to chamber 252 of the trailer relay-emergency valve 71. Trailer brake chambers 75 are connected by piping 76 and 77 to chamber 253 of the relay-emergency valve.

A governor unit 78 is provided for compressor 50 and is connected thereto by piping 79 and to reservoir 52 by piping 80.

In operation of the above-described system, compressor 50 supplies fluid under pressure, such as compressed air, to reservoirs 52 and 53, the check valve 55 permitting flow from the compressor 50 and reservoir 52 to reservoir 53, but not in the opposite direction. Fluid under pressure from the reservoirs is constantly fed to brake valve 57 and, an operation of such valve, fluid under pressure is supplied to the tractor front brake chambers 58 through pipes 59 and 60, to the tractor rear brake chambers through pipes 63 and 62, and to chamber 201 of relay valve 64 through pipes 63 and 65, thereby actuating all the tractor brakes. Fluid under pressure in chamber 201 of relay valve 64 will act to depress diaphragm 204, close the exhaust port 205, and connect chambers 202 and 203, whereby fluid under pressure will flow from reservoir 52 through pipes 67 and 66, chambers 203 and 202 of relay valve 64, pipe 68 and trailer service pipe 69, to chamber 250 of the relay-emergency valve 250. Fluid under pressure in chamber 250 of the relay-emergency valve will act to depress diaphragm 254 and open valve 255, thereby connecting trailer reservoir 73 to trailer brake chambers 75 through pipe 74, chamber 252 of the relay-emergency valve, past opened valve 255, chamber 256, past opened valve 257, chamber 253, and piping 77 and 76, thereby applying the trailer brakes.

In the event of failure of any of the pipes 59, 60, 62, 63 or 65, both tractor reservoirs will drain to atmosphere through the broken line on service operation of the brake valve. The consequent reduction in pressure in reservoir 52, pipes 67, 70 and 72, and chamber 251 of the trailer relay-emergency valve 71 will effect an emergency operation of the trailer brakes by connecting the trailer reservoir 73 to the trailer brake chambers 75 in a well known manner. In the event of failure of the lines referred to, no power braking will be available on the tractor vehicle.

In case of failure of any of pipes 51, 80, 66, 67, 70, 72 or that part of pipe 54 between reservoir 52 and check valve 55, the reservoir 52 will immediately drain to the atmosphere and the consequent reduction of pressure in chamber 251 of the trailer relay-emergency valve will cause an emergency operation of such valve, thereby applying the trailer brakes immediately. It will be noted that such operation is immediate and automatic, and is not dependent upon operation of the brake valve 57. It is also to be noted that on failure of any of the lines referred to, reservoir 53 will not drain to atmosphere through reservoir 52 due to the interposition and disposition of check valve 55, and due to the direct connections between the tractor brake chambers and the brake valve, a normal service operation of the brake valve will result in operation of the tractor brakes, regardless of the broken lines referred to.

Assuming failure of line 56 or that portion of line 54 between reservoir 53 and check valve 55, both tractor reservoirs will drain to atmosphere, no power braking on the tractor will be possible, and the reduction of pressure in reservoir 52, and consequently in chamber 251 of trailer relay-emergency valve 71, will cause an emergency application of the trailer brakes.

In the event of failure of either of lines 68 or 69, reservoir 52 will drain to atmosphere on service operation of the brake valve, and the consequent reduction in pressure in chamber 251 of the trailer relay-emergency valve will effect an emergency application of the trailer brakes, although no service application thereof will be possible.

On the trailer, in the event of failure of either of lines 76 or 77, both trailer reservoir 73 and tractor reservoir 52 would drain to atmosphere on service operation of the brake valve, no power braking being possible on the trailer, but power braking being had in normal manner on the tractor due to the disposition of check valve 55.

Referring now particularly to Fig. 3 of the drawings, it will be seen that a modified system has been provided in which a compressor 100 supplies fluid under pressure, such as compressed air, to three reservoirs 101, 102 and 103 through pipes 104, 105 and 106 containing one-way check valves 107, 108 and 109 respectively. A brake valve 110, of usual design, is provided, and the same is constantly supplied with fluid under pressure from reservoir 102 through pipe 111. Relay valves 112 and 113 are provided, and the chambers 201 of such valves are connected by pipes 114 and 115 respectively, to the brake valve 110, and are normally connected to atmosphere through the exhaust port in said brake valve. The chamber 202 of relay valve 112 is connected by piping 116 and 117, to the tractor front brake chambers 118 and the tractor rear brake chambers 119, and chamber 203 of the relay valve is connected by pipe 120 to reservoir 101. Chamber 203 of relay valve 113 is connected by pipe 121 to reservoir 103, and chamber 202 of this relay valve is connected by pipe 122 to the trailer service pipe 123 which is connected to chamber 250 of trailer relay-emergency valve 125. Tractor reservoir 103 is connected by pipe 126 to trailer emergency pipe 127, which is connected to chamber 251 of the relay-emergency valve 125. Trailer reservoir 124 is connected by pipe 128 to chamber 252 of the relay-emergency valve and trailer brake chambers 129 are connected by pipes 130 to chamber 253 of the relay-emergency valve. A governor unit 131 is provided for controlling the action of compressor 100 and such governor unit is connected by pipe 132 to reservoir 101 and by pipe 133 to the compressor.

In operation of the above-described system, compressor 100 supplies fluid under pressure, such as compressed air, to reservoirs 101, 102 and 103, the disposition of the three check valves being such that each reservoir is isolated from the other reservoirs, and no back-flow is permitted to the compressor. Fluid under pressure from reservoir 102 is supplied constantly to brake valve 110 and on operation of such brake valve, fluid under pressure will flow to the chambers 201 of relay valves 112 and 113, depressing the diaphragms 204 therein, closing the exhaust ports 205, and connecting the chambers 202 and 203. On such operation of relay valve 112, reservoir 101 will supply fluid under pressure to front brake chambers 118 through pipe 120, chambers 203 and 202 of relay valve 112, and pipes 116, and to rear brake chambers 119 through pipe 120, chambers 203 and 202 of relay valve 112, and pipes 117, thereby applying all tractor brakes. On the above described operation of relay valve 113, fluid under pressure from reservoir 103 will flow to chamber 250 of trailer relay-emergency valve 125, through pipe 121, chambers 203 and 202 of relay valve 113 and pipes 122 and 123, thereby depressing the diaphragm 254, opening valve 255 and allowing fluid under pressure from trailer reservoir 124 to flow to trailer brake chambers 129 through pipe 128, chamber 252 of the relay-emergency valve, past opened valve 255, chamber 256, past opened valve 257, chamber 258, and pipes 130, thereby applying the tractor brakes. The above describes a normal service operation of the tractor and trailer braking systems.

For an emergency application of the brakes, it must be assumed that certain pipes or parts break or otherwise fail. In the event of failure of any of pipes 126, 127 or 121, reservoir 103 will drain to atmosphere and the consequent reduction in pressure in chamber 251 of relay-emergency valve 125 will cause trailer reservoir 124 to be immediately connected to trailer brake chambers 129, thereby causing an application of the trailer brakes. It will be seen therefore that failure of any of the pipes listed above will result in an automatic, emergency application of the trailer brakes.

In the event of failure of either of lines 114 and 115, on operation of brake valve 110, reservoir 102 will drain to atmosphere and neither of the relay valves will be operated. Consequently no braking may be had on either the tractor or trailer. The same result will be obtained in the event of the failure of pipe 111 except for the fact that reservoir 102 will drain immediately, without any operation of brake valve 110.

Should any of the lines 116 or 117 fail, operation of relay valve 112 will cause the reservoir 101 to drain to atmosphere through the broken line, and no power braking may be had on the tractor vehicle. Due, however, to the interposition of the check valves 108 and 109 and the diaphragm in relay valve 112, the other reservoirs will not drain and power braking may be had on the trailer.

In case of failure of either of lines 122 or 123, on operation of relay valve 113, in making a service application, reservoir 103 will drain to atmosphere through pipe 121, chambers 203 and 202 of relay valve 113, and through the broken pipe. Draining of reservoir 103 will result in a decrease in pressure in chamber 251 of the relay-emergency valve 125, and consequently trailer emergency reservoir 124 will be connected to trailer brake chambers 129 through pipe 128, chamber 252 of the relay-emergency valve, between the annular ridge 259 and the diaphragm 258, to chamber 253, and through pipes 130. The failure of either of the pipes noted above will not affect the operation of the tractor brakes and therefore a normal amount of braking will result on the tractor and trailer vehicles, although the trailer braking will be in the nature of an emergency operation.

It should be noted that in the event of failure of any of pipes 104, 105, 106, 120, 111, 126, 121 or 132, pressure cannot be built up in any of the reservoirs until the broken line is repaired or reservoir connected to the broken line is shut off from the other reservoirs, as all fluid discharged from the compressor will immediately go to atmosphere through the broken line.

Referring now particularly to Fig. 4 of the drawings, the same disclosing a modified system according to the present invention, it will be observed that a compressor 150 supplies fluid under pressure to three reservoirs 151, 152 and 153 through pipes 154, 155, and 156, such pipes including one-way check valves 157, 158 and 159 which allow compressed fluid to flow from the compressor to the reservoirs but prevent flow from any one of the reservoirs to the compressor or to any other reservoir. Reservoir 152 is connected by pipe 160 to brake valve 161 and constantly supplies fluid under pressure thereto. Relay valves 162 and 163 are provided, pipe 164 connecting chamber 201 of relay valve 162 to the brake valve, and pipes 165 and 166 connecting relay valve 163 to the brake valve. Pipe 166 is connected to pipes 167 leading to the tractor rear brake chambers 168. Chamber 202 of relay valve 162 is connected to the tractor front brake chambers 169 by pipes 170, and chamber 203 of relay valve 162 is connected by pipe 171 to reservoir 151. Reservoir 151 is also connected by pipe 172 to trailer emergency line 173, which is connected to chamber 251 of the trailer relay-emergency valve 174, such chamber being therefore, subject at all times to the pressure of reservoir 151, and such pressure in chamber 251 therefore maintaining the central portion of diaphragm 258 raised and valve 257 in open position. Chamber 203 of relay valve 163 is connected by pipe 175 to reservoir 153, and chamber 202 is connected to pipe 176 which is connected to the trailer service line 177, the same being connected to chamber 250 of trailer relay-emergency valve 174. Trailer reservoir 178 is connected by pipe 179 to chamber 252 of the relay-emergency valve 174 and pressure from said reservoir constantly acts on the upper side of diaphragm 258, maintaining the marginal portion thereof in sealed engagement with the valve casing. Trailer brake chambers 180 are connected by pipes 181 to chamber 253 of the relay emergency valve 174 and are normally connected to atmosphere through said valve. A governor unit 182 is provided for regulating the action of the compressor, such unloader being connected to reservoir 151 through pipe 183 and to the compressor 150 through pipe 184.

In the operation of the above-described system, compressor 150 supplies fluid under pressure, such as compressed air, to reservoirs 151, 152 and 153, the check valves 157, 158 and 159 isolating each reservoir, as hereinbefore described. Fluid under pressure is constantly supplied to brake valve 161 by reservoir 152 through pipe 160, and, on operation of said brake valve to effect a normal service application, such compressed fluid is supplied by the brake valve to chambers 201 of relay valves 162 and 163, through pipe 164 and pipes 166 and 165 respectively, depressing the diaphragms therein, shutting off the exhaust openings 205, and connecting chambers 202 and 203. Compressed fluid from reservoir 152 also flows directly to the tractor rear brake chambers 168 through pipe 160, brake valve 161, and pipes 166 and 167, thereby causing a service application of such brakes. The above-described operation of relay valve 162 causes compressed fluid in reservoir 151 to flow to the tractor front brake chambers 169, causing a service application thereof. The described operation of relay valve 163 causes compressed fluid in tractor reservoir 153 to flow to the chamber 250 of trailer relay-emergency valve 174 through pipe 175, chambers 203 and 202 of relay valve 163, pipe 176, and trailer service line 177, thereby depressing diaphragm 254 of the relay-emergency valve 174 and allowing compressed fluid in trailer reservoir 178 to flow to the trailer brake chambers 180 through pipe 179, chamber 252 of the relay-emergency valve 174, past opened valve 255, chamber 256, past opened valve 257, chamber 253, and pipes 181, effecting a service application of the trailer brakes. The above describes a normal service brake application.

In order to describe an emergency operation it is necessary to assume that certain pipes break or otherwise fail. If it be assumed that any of pipes 171, 172, 173, or 183 break or otherwise fail, reservoir 151 would immediately drain to atmosphere, the resulting drop in pressure in chamber 251 of relay-emergency valve 174 causing the center portion of diaphragm 258 to be depressed and valve 257 to close, thereby causing fluid under pressure in trailer reservoir 178 to flow to trailer brake chambers 180 through pipe 179, chamber 252 of the relay-emergency valve 174, past the annular ridge 259, chamber 253, and pipes 181, thereby applying the trailer brakes. It should be noted that such operation is immediate and automatic and is not dependent in any way upon the operation of the tractor brake valve.

In the event of failure of pipes 170, reservoir 151 would drain to atmosphere, an operation of the brake valve, through pipe 171, chambers 203 and 202, and through the ruptured pipe. The consequent reduction in pressure in reservoir 151 would reduce the pressure acting in chamber 251 of the relay-emergency valve 174, thereby permitting pressure of trailer reservoir 178 acting in the chamber 252 to force diaphragm 258 downwardly, closing valve 257 and allowing such trailer reservoir presure to flow to trailer brake chambers 180, thereby effecting a service operation of the trailer brakes. It will be noted that in the event of failure of the pipes noted, the tractor front brakes 169 will not be operated but, due to the interposition of the one-way check valves and the relay valve 162, the operation of the tractor rear brakes 168 will not be affected.

In case of failure of pipe 160, reservoir 152 will drain to atmosphere immediately and no fluid under pressure will be available, when brake valve 161 is operated, to effect the operation of relay valves 162 and 163 or to operate the tractor rear brake chambers 168. Consequently no power braking will be available in the event of the above-noted failure.

Assuming failure of any of pipes 164, 165, 166 or 167, on operation of brake valve 161 to effect a service application, reservoir 152 will drain to atmosphere through pipe 160, brake valve 161 and the broken line. In this condition, as in the preceding situation, no compressed fluid will be available to initiate braking and hence no power braking will be available on either tractor or trailer.

In the event of failure of any of pipes 175, 176, or 177, on operation of brake valve 161 and relay valve 163, no compressed fluid will be transmitted to chamber 250 of relay-emergency valve 174 and consequently there will be no service braking on the trailer. Due to the fact that no reduction of pressure in reservoir 151 has occurred due to the ruptured lines, there will be no emergency trailer application. Normal service application will occur, however, on the tractor vehicle due to the interposition of the check valves and relay valves.

In the event of failure of pipes 181, trailer reservoir 178 will drain to atmosphere when a normal service application is attempted, through pipe 179, past opened valve 255, chamber 256, past opened valve 257, chamber 253, and through the broken line 181. The reduction of pressure in chamber 252 will cause tractor reservoir 151 to drain to atmosphere through pipes 172 and 173, chamber 251, past the edge of diaphragm 258, chamber 252, past opened valve 255, chamber 256, past opened valve 257, chamber 253 and through the ruptured line, thereby preventing operation of the tractor front brakes, but not preventing normal operation of the tractor rear brakes fed from reservoir 152.

In case of failure of pipe 179, trailer reservoir 178 will immediately drain to atmosphere and the consequent reduction in pressure in chamber 251 of the relay-emergency valve will cause tractor reservoir 151 to drain to atmosphere as outlined above, thereby preventing operation of the tractor front brakes but not the tractor rear brakes.

Referring now particularly to Fig. 5 of the drawings, the same disclosing a further modified system, a compressor 300 supplies fluid under pressure to reservoirs 301, 302 and 303 through pipe 304 and branch pipes leading therefrom to each of the reservoirs, each of said branch pipes including a one-way check valve, respectively numbered 305, 306 and 307, whereby compressed fluid may flow to each of the reservoirs but may not flow from any one of the reservoirs to either the compressor or any other reservoir. A brake valve 308 is provided and the same is constantly supplied with compressed fluid from reservoir 302 through pipe 309. Relay valves 310 and 311 are provided and the chamber 201 of each of said relay valves is connected to the brake valve 308, relay valve 310 being connected by pipe 312 and relay valve 311 by pipes 313 and 314. Chamber 202 of relay valve 310 is connected by pipes 315 to tractor front brake chambers 316, and chamber 203 of relay valve 310 is connected by pipe 317 to reservoir 301. Chamber 202 of relay valve 311 is connected by pipes 318 to tractor rear brake chambers 319, and chamber 203 of relay valve 311 is connected by pipe 320 to reservoir 303. A third relay valve 321 is provided, and chamber 201 thereof is connected by pipes 313 and 322 to the brake valve 308. Chamber 203 of relay valve 321 is connected by pipes 317 and 323 to chamber 203 of relay valve 310. Chamber 202 of relay valve 321 is connected to the trailer service line 324 by pipe 325, the trailer service line 324 leading to chamber 250 of trailer relay-emergency valve 326. Reservoir 301 is connected to the trailer emergency line 327 by pipe 328, the trailer emergency line leading to chamber 251 of the relay emergency valve 326 and pressure from reservoir 301 thereby normally maintaining diaphragm 258 raised and valve 257 in open position. Trailer reservoir 329 is connected by pipe 330 to chamber 252 of relay-emergency valve 326, and pressure therefrom is normally exerted against the upper side of diaphragm 258. Trailer brake chambers 331 are connected by pipes 332 to chamber 253 of relay-emergency valve 326. A governor unit 333 is provided for controlling the operation of compressor 300, such governor unit being connected by pipe 334 to compressor 300 and by pipe 335 to pipe 323 thereby connecting to reservoir 301. A pressure gauge 336 is provided and is connected by pipes 337 and 323 to reservoir 301.

In the operation of the above-described system, compressor 300 supplies fluid under pressure, such as compressed air, to reservoirs 301, 302 and 303, the disposition of the check valves 305, 306 and 307 permitting flow to said reservoirs, but not in the opposite direction. Reservoir 302 constantly supplies compressed fluid to brake valve 308, and on operation of said brake valve, fluid under pressure from reservoir 302 will flow to the chambers 201 of relay valves 310, 311 and 321, depressing the diaphragms therein, closing exhaust ports 205, and connecting chambers 202 and 203. Such operation of relay valve 310 will cause compressed fluid from reservoir 301 to flow to tractor front brake chambers 316 through pipe 317, chambers 203 and 202 of relay valve 310, and pipes 315, thereby effecting a normal or service application. The described operation of relay valve 311 will cause fluid under pressure from reservoir 303 to flow to tractor rear brake chambers 319 through pipe 320, chambers 203 and 202 of relay valve 311, and pipes 318, thereby effecting a service application of the rear brakes. The described operation of relay valve 321 will effect the connection of reservoir 301 to chamber 250 of trailer relay-emergency valve 326 through pipe 323, chambers 203 and 202 of relay valve 321 and pipes 325 and 324, thereby depressing diaphragm 254 and opening valve 255, thereby connecting trailer reservoir 329 to trailer brake chambers 331 through pipe 330, chamber 252 of relay-emergency valve 326, past opened valve 255, chamber 256, past opened valve 257, chamber 253, and pipes 332, thereby effecting a service application of the trailer brakes. The above describes a normal service operation of the tractor and trailer braking systems.

An emergency application occurs on the breaking of any of certain pipes of the system. In the event of the failure of pipe 309, no power breaking will be available on either truck or trailer due to the fact that no compressed fluid will be available to actuate any of the three relay valves.

In the event of failure of pipe 320, reservoir 303 will immediately drain to the atmosphere and the tractor rear brakes cannot, therefore, be operated. Due to the interposition of relay valves 310 and 311 normal operation of the tractor front brakes and trailer brakes may be had. The same result will be had if pipe 318 breaks, in this case reservoir 303 not draining until relay valve 311 is operated.

In case of failure of any of pipes 317, 323, 328, 327, 335 or 337, reservoir 301 will drain to atmosphere immediately and no operation of the tractor front brakes will therefore be available. The consequent reduction of pressure in chamber 251 of relay-emergency valve 326 due to the draining of reservoir 301 will operate to connect trailer reservoir 329 to trailer brake chambers 331, through pipe 330, chamber 252 of relay-emergency valve 326, past the annular ridge 259, chamber 253, and pipes 332. It should be noted that such operation is entirely automatic and does not depend on operation of the brake valve. The draining of reservoir 301 will also prevent the normal service operation of the trailer brakes due to the fact that compressed fluid cannot be supplied to chamber 250 of relay-emergency valve. The same results will follow from the failure of any of pipes 315, 325 or 324, except that the draining of reservoir 301 will not occur until either of relay valves 310 or 321 are operated, the emergency operation of the relay-emergency valve 326 taking place at that time instead of immediately.

In the event of failure of any of pipes 312, 313, 314 or 322, reservoir 302 will drain to atmosphere on operation of brake valve 308, thereby preventing the operation of any of the relay valves 310, 311 or 321, thereby precluding the operation of either the tractor or trailer brake systems.

In the event of failure of pipe 330, the trailer reservoir will immediately drain to atmosphere, and the consequent reduction of pressure on the upper side of diaphragm 258 in relay-emergency valve 326 will cause tractor reservoir 301 to drain to atmosphere through pipe 328, pipe 327, chamber 251 of the relay-emergency valve, past the edge of diaphragm 258, chamber 252, and through the broken line to atmosphere. Draining of reservoir 301 will prevent operation of tractor front brake chamber 316, the tractor rear brakes being only applied on operation of brake valve 308.

Assuming failure of pipes 332, leading to the trailer brake chambers, on operation of the relay-emergency valve 326 to give a service application, trailer reservoir 329 will drain to atmosphere through pipe 330, chamber 252 of relay-emergency valve 326, past opened valve 255, chamber 256, past opened valve 257, chamber 253 and through the broken line. Draining of reservoir 329 will cause a consequent reduction in pressure on the upper side of diaphragm 258, resulting in the draining of tractor reservoir 301 to atmosphere through pipe 328, pipe 327, chamber 251 of the relay-emergency valve, past the edge of diaphragm 258, chamber 252, past opened valve 255, chamber 256, past opened valve 257, chamber 253, and through the broken line. Tractor front brakes 316 cannot thereafter be applied due to the draining of reservoir 301, but the tractor rear brakes 319 may be actuated due to the interposition of the check valves and relay valves.

It will be seen from the above descriptions that a number of novel braking systems have been provided which insure power braking on a tractor-trailer vehicle under almost all adverse operating conditions. While certain arrangements and modifications of the system have been illustrated and described herein, it is to be expressly understood that the invention is not limited thereto, but may be embodied in other tractor-trailer systems, as will be understood by those skilled in the art. Reference will therefore be had to the appended claims for a definition of the limits of the invention.

What is claimed is:

1. A fluid pressure braking system comprising a compressor, a plurality of reservoirs connected thereto, tractor braking devices, trailer braking devices, a tractor-carried relay valve for connecting one of said reservoirs to said trailer braking devices, a relay valve for connecting another of said reservoirs to said tractor braking devices, independent fluid pressure operated means for operating both of said relay valves, and a unitary manually-operable valve for simultaneously connecting said plurality of reservoirs to said fluid pressure operated means in order to effect operation of said relay valves.

2. A fluid pressure braking system comprising tractor front braking devices, tractor rear braking devices, trailer braking devices, control means for said trailer braking devices, a plurality of tractor-carried reservoirs, valve means for connecting one of said reservoirs to said tractor front brakes, valve means for connecting another of said reservoirs to said control means, and means for connecting another of said reservoirs to said first-named valve means, said second-named valve means, and said tractor rear braking devices for simultaneously operating the same.

3. A fluid pressure braking system comprising tractor front braking devices, tractor rear braking devices, trailer braking devices, control means for said trailer braking devices, a plurality of tractor-carried reservoirs, means for connecting one of said reservoirs to said tractor front brakes, means for connecting said reservoir to said control means, means for connecting another of said reservoirs to said tractor rear braking devices, and means for connecting another of said reservoirs to each of said three connecting means.

4. In a fluid pressure tractor-trailer braking system, braking devices on said tractor, braking devices on said trailer, a pressure-operated relay valve carried by the trailer for controlling the application of fluid pressure to said trailer braking devices, a pressure-operated relay valve carried by the tractor for controlling the application of fluid pressure to said first named relay valve, a compressor, a plurality of reservoirs, connections between said compressor and reservoirs including one-way check valves permitting flow of fluid from said compressor to said reservoirs only, a pressure-operated relay valve on the tractor for connecting one of said reservoirs to said tractor braking devices, connections between said tractor-carried relay valves and said reservoirs including a unitary control valve for simultaneously supplying said last named relay valves with fluid pressure to operate the same, and one-way check valves in said last named connections for preventing communication between said reservoirs.

WILFRED A. EATON.